United States Patent
Murakami et al.

(10) Patent No.: US 10,208,161 B2
(45) Date of Patent: Feb. 19, 2019

(54) RESIN MODIFIER AND RESIN COMPOSITION USING SAME

(71) Applicant: ADEKA CORPORATION, Tokyo (JP)

(72) Inventors: Takashi Murakami, Saitama (JP); Chikako Kasai, Saitama (JP); Hiroshi Ikeda, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 15/563,436

(22) PCT Filed: Mar. 25, 2016

(86) PCT No.: PCT/JP2016/059711
§ 371 (c)(1),
(2) Date: Sep. 29, 2017

(87) PCT Pub. No.: WO2016/158790
PCT Pub. Date: Oct. 6, 2016

(65) Prior Publication Data
US 2018/0066105 A1    Mar. 8, 2018

(30) Foreign Application Priority Data

Mar. 31, 2015 (JP) .................................. 2015-072362

(51) Int. Cl.
| | |
|---|---|
| C08K 5/10 | (2006.01) |
| C08L 1/00 | (2006.01) |
| C08L 1/02 | (2006.01) |
| C09K 3/00 | (2006.01) |
| C09K 3/10 | (2006.01) |
| C08G 63/12 | (2006.01) |
| C08G 63/91 | (2006.01) |
| C08L 67/02 | (2006.01) |
| C08L 1/14 | (2006.01) |
| C08B 15/00 | (2006.01) |

(52) U.S. Cl.
CPC ............. *C08G 63/12* (2013.01); *C08G 63/91* (2013.01); *C08K 5/10* (2013.01); *C08L 1/00* (2013.01); *C08L 1/02* (2013.01); *C08L 67/02* (2013.01); *C09K 3/00* (2013.01); *C09K 3/1015* (2013.01); *C08B 15/00* (2013.01)

(58) Field of Classification Search
CPC .......... C08G 63/12; C08G 63/91; C08K 5/10; C09K 3/1015; C08L 67/02; C08L 1/02; C08B 15/00
See application file for complete search history.

(56) References Cited

U.S. PATENT DOCUMENTS

| 2007/0048462 A1 | 3/2007 | Takebe et al. |
| 2008/0058466 A1 | 3/2008 | Joshi et al. |
| 2010/0308264 A1 | 12/2010 | Furukawa et al. |
| 2011/0001904 A1 | 1/2011 | Tachikawa et al. |
| 2015/0051326 A1 | 2/2015 | Sunkara et al. |
| 2015/0135990 A1 | 5/2015 | Harada et al. |

FOREIGN PATENT DOCUMENTS

| JP | 59-193921 A | 11/1984 |
| JP | 5-117528 A | 5/1993 |
| JP | 11-124431 A | 5/1999 |
| JP | 2009-41009 A | 2/2009 |
| JP | 2010-502819 A | 1/2010 |
| JP | 2010-47705 A | 3/2010 |
| JP | 2010-248493 A | 11/2010 |
| JP | 2011-105924 A | 6/2011 |
| JP | 2013-61561 A | 4/2013 |
| JP | 2013185100 A * | 9/2013 |
| JP | 2013-234273 A | 11/2013 |
| JP | 2015-83646 A | 4/2015 |
| WO | WO 2007/000910 A1 | 1/2007 |
| WO | WO 2013/027793 A1 | 2/2013 |

OTHER PUBLICATIONS

International Search Report for PCT/JP2016/059711 (PCT/ISA/210) dated May 10, 2016.
Written Opinion of the International Searching Authority for PCT/JP2016/059711 (PCT/ISA/237) dated May 10, 2016.
Extended European Search Report, dated Aug. 23, 2018, for European Application No. 16772671.0.

* cited by examiner

*Primary Examiner* — Vishal V Vasisth
(74) *Attorney, Agent, or Firm* — Birch, Stewart, Kolasch & Birch, LLP

(57) ABSTRACT

Provided are: a resin modifier which is capable of imparting a resin with excellent moisture resistance, dimensional stability and optical properties; and a resin composition including the same. The resin modifier contains a compound represented by the following Formula (1):

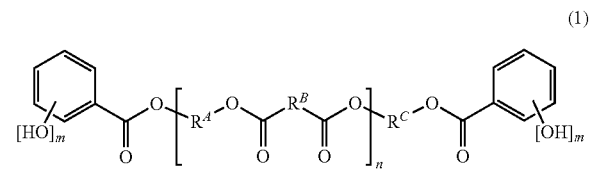

(wherein, m represents an integer of 1 to 5; n represents an integer of 0 to 50; and $R^A$, $R^B$ and $R^C$ each represent a hydrocarbon group having 2 to 20 carbon atoms, or a hydrocarbon group having 2 to 20 carbon atoms which has at least one atom selected from the group consisting of an oxygen atom, a sulfur atom and a nitrogen atom).

9 Claims, No Drawings

RESIN MODIFIER AND RESIN COMPOSITION USING SAME

This application is a 371 of PCT/JP2016/059711, filed Mar. 25, 2016.

TECHNICAL FIELD

The present invention relates to a resin modifier (hereinafter, also simply referred to as "modifier") and a resin composition comprising the same. More particularly, the present invention relates to: a resin modifier which is capable of imparting a resin with excellent moisture resistance, dimensional stability and optical properties; and a resin composition comprising the same.

BACKGROUND ART

In recently years, resin films such as cellulose acylate films, polycarbonate films, polyacrylate films and polyolefin films have been used mainly as polarizing plate protective films and optical compensation films for liquid crystal display devices. Thereamong, cellulose acylate films have been widely used because of their excellent adhesiveness with polyvinyl alcohols used in polarizers as well as high transparency and appropriate strength.

However, cellulose acylate films have high moisture permeability and thus have a drawback in that permeation of external moisture therethrough causes detachment from a polarizer and deterioration of the polarizer itself. Further, under high-temperature and high-humidity conditions, there are also problems in contraction of polarizing plate protective films and optical compensation films caused by moisture absorption (dimensional stability) and phase difference variation associated with the visibility (optical properties). In recent years, polarizing plate protective films and optical compensation films are further reduced in thickness in association with thickness reduction of liquid crystal display devices, and superior moisture resistance, dimensional stability and optical properties are demanded.

With regard to these problems, Patent Document 1 proposes an additive for cellulose ester resins which comprises an aromatic ring-free polyester composed of a dihydric alcohol and a dibasic acid and imparts a high retardation value to cellulose ester resin-made films. Moreover, Patent Document 2 proposes an additive for cellulose ester resins which comprises an ester compound that exhibits excellent bleeding resistance under high-temperature and high-humidity conditions and is unlikely to be vaporized in the production process.

RELATED ART DOCUMENTS

Patent Documents

Patent Document 1: WO 2007/000910
Patent Document 2: Japanese Unexamined Patent Application Publication No. 2010-248493

SUMMARY OF THE INVENTION

Problems to be Solved by the Invention

However, in Patent Document 1, although it is disclosed that low moisture permeability is desired, no concrete examination is made with regard to an improvement. Further, in Patent Document 2, the dimensional stability is not examined, and the performance relating to the moisture permeability is still not sufficient and satisfactory. In view of these, a modifier which is satisfactory in all of moisture resistance, dimensional stability and optical properties has not been discovered until now.

Therefore, an object of the present invention is to provide: a resin modifier which is capable of imparting a resin with excellent moisture resistance, dimensional stability and optical properties; and a resin composition comprising the same.

Means for Solving the Problems

The present inventors intensively studied to solve the above-described problems and consequently discovered that the problems can be solved by using a compound having the following structure as a resin modifier, thereby completing the present invention.

That is, the resin modifier of the present invention is characterized by comprising a compound represented by the following Formula (1):

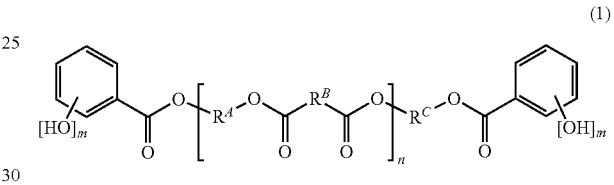

(wherein, m represents an integer of 1 to 5; n represents an integer of 0 to 50; and $R^A$, $R^B$ and $R^C$ each represent a hydrocarbon group having 2 to 20 carbon atoms, or a hydrocarbon group having 2 to 20 carbon atoms which has at least one atom selected from the group consisting of an oxygen atom, a sulfur atom and a nitrogen atom).

In the resin modifier of the present invention, $R^A$, $R^B$ and $R^C$ of the compound represented by the Formula (1) are each preferably a hydrocarbon group having 2 to 12 carbon atoms, or a hydrocarbon group having 2 to 12 carbon atoms which has at least one atom selected from the group consisting of an oxygen atom, a sulfur atom and a nitrogen atom. The resin modifier of the present invention is preferably used in a thermoplastic resin, particularly a cellulose-based resin.

The resin composition of the present invention is characterized by comprising the resin modifier of the present invention.

Effects of the Invention

According to the present invention, a resin modifier which is capable of imparting a resin with excellent moisture resistance, dimensional stability and optical properties, and a resin composition comprising the same can be provided.

Mode for Carrying Out the Invention

Embodiments of the present invention will now be described in detail.

The resin modifier of the present invention comprises a compound represented by the following Formula (1) and is capable of imparting a resin with excellent moisture resistance, dimensional stability and optical properties:

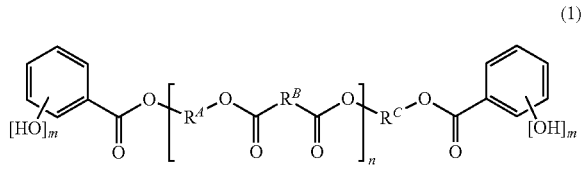
(1)

In the Formula (1), m represents an integer of 1 to 5, preferably 1 to 3, more preferably 1. When m is 3, hydroxyl groups preferably exist at the 3-, 4- and 5-positions on each aromatic ring; when m is 2, hydroxyl groups preferably exist at the 3- and 5-positions on each aromatic ring; and when m is 1, a hydroxyl group more preferably exists at the 4-position on each aromatic ring.

Further, in the Formula (1), n is an integer of 0 to 50, preferably 0 to 30, more preferably 0 to 20. The method of producing the resin modifier of the present invention is not particularly restricted, and a compound represented by the Formula (1) can be obtained by, for example, adding divalent acid components (e.g., succinic acid and terephthalic acid) and their anhydrides and acid chlorides along with a glycol component (e.g., ethylene glycol or propylene glycol) and a monovalent acid component (e.g., p-hydroxybenzoic acid) all together at once or in portions in the presence or absence of a catalyst, allowing these components to undergo an esterification reaction or a transesterification reaction, and subsequently performing a post-treatment of the resultant in accordance with a conventional method.

In this case, the resulting compound has a molecular weight distribution. The resin modifier of the present invention may be a mixture of compounds having a molecular weight distribution or a single product obtained by purification of such compounds through distillation or the like; however, from the economic standpoint, the resin modifier of the present invention is preferably a mixture of compounds having a molecular weight distribution. In the case of a mixture of compounds having a molecular weight distribution, from the standpoint of attaining excellent moisture permeability and optical properties (phase difference variation), the compounds represented by the Formula (1) contain a compound wherein n is 0 in an amount of preferably 0 to 80% by mass, more preferably 5 to 75% by mass, still more preferably 10 to 60% by mass.

In the resin modifier of the present invention, examples of the hydrocarbon group having 2 to 20 carbon atoms, preferably 2 to 12 carbon atoms, which is represented by $R^A$, $R^B$ and $R^C$ in the Formula (1), include linear or branched alkylene groups, linear or branched alkenylene groups, linear or branched cycloalkylene groups optionally having a substituent, and linear or branched arylene groups optionally having a substituent, which groups have 2 to 20 carbon atoms. The term "substituent" used herein refers to an alkyl group or an alkylene group.

Thereamong, the hydrocarbon group is preferably a linear or branched alkylene or arylene group, more preferably a linear or branched alkylene or arylene group having 2 to 12 carbon atoms, still more preferably an ethylene group, an n-propylene group, an isopropylene group, an n-butylene group, an isobutylene group, an n-pentylene group, an isopentylene group, an n-hexylene group, an isohexylene group, an n-heptylene group, an isoheptylene group, an n-octylene group, an isooctylene group, an n-nonylene group, an isononylene group, an n-decylene group, an isodecylene group, an n-undecylene group, an isoundecylene group, an n-dodecylene group, an isododecylene group, a phenylene group or a naphthylene group, most preferably an ethylene group, an n-propylene group, an isopropylene group, an n-butylene group or an isobutylene group.

In the resin modifier of the present invention, the hydrocarbon group represented by $R^A$, $R^B$ and $R^C$ in the Formula (1) may be substituted with one or more atoms selected from the group consisting of an oxygen atom, a sulfur atom and a nitrogen atom, and the hydrocarbon group having 2 to 20 carbon atoms, preferably 2 to 12 carbon atoms, may be, for example, one in which one or more hydrogen atoms are substituted with a substituent having an oxygen atom, a sulfur atom and/or a nitrogen atom, or one in which one or more carbon atoms are substituted with an oxygen atom, a sulfur atom or a nitrogen atom.

In cases where one or more hydrogen atoms are substituted with a substituent having an oxygen atom, a sulfur atom and/or a nitrogen atom, examples of the substituent include a hydroxy group, an alkoxy group, an aryloxy group, an acyl group, a carbonyl group, and a carboxy group.

In cases where one or more carbon atoms are substituted with an oxygen atom, a sulfur atom or a nitrogen atom, the hydrocarbon group contains, for example, an ether bond, a sulfide bond, or an amine bond. $R^A$ and $R^C$ are preferably diethyl ether-1,1'-diyl. Further, $R^B$ is preferably an ethylene group, an n-propylene group or a phenylene group. $R^A$ and $R^B$, which exist in the number of n, and $R^C$ may be the same or different from one another.

The molecular weight of the resin modifier of the present invention is not particularly restricted; however, from the standpoints of the compatibility with a resin and the moisture resistance performance, the number-average molecular weight is preferably 350 to 5,000, more preferably 350 to 2,000, still more preferably 350 to 1,500. The number-average molecular weight can be measured by gel permeation chromatography (GPC).

The amount of the resin modifier of the present invention to be incorporated is not particularly restricted; however, the resin modifier of the present invention is incorporated in an amount of 0.1 to 100 parts by mass, preferably 0.5 to 80 parts by mass, more preferably 1 to 50 parts by mass, still more preferably 1 to 30 parts by mass, with respect to 100 parts by mass of a resin. When the amount is less than 0.1 parts by mass, the performances such as moisture resistance, dimensional stability and optical properties (phase difference variation) may not be sufficiently exerted, whereas when the amount is greater than 100 parts by mass, bleeding of the resin modifier may occur.

Examples of the resin modifier of the present invention which is represented by the Formula (1) are provided below; however, the present invention is not restricted thereto. The numbers in parentheses of the following resin modifiers A to Q each indicate a molar ratio, and these compounds may be used individually, or two or more thereof may be used in combination.

Modifier A: a condensate of succinic acid (95)/terephthalic acid (5)/1,2-propylene glycol (100), which is capped with p-hydroxybenzoic acid ester on both ends (number-average molecular weight: 880, ratio of compound wherein n is 0:15% by mass)

Modifier B: a condensate of succinic acid (50)/terephthalic acid (50)/1,2-propylene glycol (100), which is capped with p-hydroxybenzoic acid ester on both ends (number-average molecular weight: 880, ratio of compound wherein n is 0:15% by mass)

Modifier C: a condensate of succinic acid (50)/terephthalic acid (50)/1,2-propylene glycol (100), which is capped with p-hydroxybenzoic acid ester on both ends (number-average molecular weight: 650, ratio of compound wherein n is 0:20% by mass)

Modifier D: a condensate of succinic acid (50)/terephthalic acid (50)/ethylene glycol (100), which is capped with p-hydroxybenzoic acid ester on both ends (number-average molecular weight: 570, ratio of compound wherein n is 0:23% by mass)

Modifier E: a condensate of succinic acid (30)/terephthalic acid (70)/1,2-propylene glycol (100), which is capped with p-hydroxybenzoic acid ester on both ends (number-average molecular weight: 740, ratio of compound wherein n is 0:17% by mass)

Modifier F: a condensate of succinic acid (30)/terephthalic acid (70)/1,3-butylene glycol (100), which is capped with p-hydroxybenzoic acid ester on both ends (number-average molecular weight: 660, ratio of compound wherein n is 0:20% by mass)

Modifier G: a condensate of succinic acid (5)/terephthalic acid (95)/1,2-propylene glycol (100), which is capped with p-hydroxybenzoic acid ester on both ends (number-average molecular weight: 1190, ratio of compound wherein n is 0:10% by mass)

Modifier H: a condensate of succinic acid (100)/1,2-propylene glycol (100), which is capped with p-hydroxybenzoic acid ester on both ends (number-average molecular weight: 650, ratio of compound wherein n is 0:29% by mass)

Modifier I: a condensate of terephthalic acid (100)/1,3-butylene glycol (100), which is capped with p-hydroxybenzoic acid ester on both ends (number-average molecular weight: 700, ratio of compound wherein n is 0:23% by mass)

Modifier J: a condensate of succinic acid (50)/terephthalic acid (50)/ethylene glycol (50)/1,2-propylene glycol (50), which is capped with p-hydroxybenzoic acid ester on both ends (number-average molecular weight: 550, ratio of compound wherein n is 0:24% by mass)

Modifier K: a condensate of succinic acid (50)/terephthalic acid (50)/1,3-butylene glycol (100), which is capped with p-hydroxybenzoic acid ester on both ends (number-average molecular weight: 670, ratio of compound wherein n is 0:27% by mass)

Modifier L: a condensate of phthalic acid (100)/1,2-propylene glycol (100), which is capped with p-hydroxybenzoic acid ester on both ends (number-average molecular weight: 640, ratio of compound wherein n is 0:30% by mass)

Modifier M: a condensate of terephthalic acid (100)/1,2-propylene glycol (100), which is capped with p-hydroxybenzoic acid ester on both ends (number-average molecular weight: 640, ratio of compound wherein n is 0:24% by mass)

Modifier N: a condensate of succinic acid (50)/terephthalic acid (50)/1,2-propylene glycol (100), which is capped with p-hydroxybenzoic acid ester on both ends (number-average molecular weight: 490, ratio of compound wherein n is 0:39% by mass)

Modifier O: a condensate of succinic acid (50)/terephthalic acid (50)/ethylene glycol (10)/diethylene glycol (90), which is capped with p-hydroxybenzoic acid ester on both ends (number-average molecular weight: 410, ratio of compound wherein n is 0:51% by mass)

Modifier P: a condensate of terephthalic acid (100)/ethylene glycol (100), which is capped with p-hydroxybenzoic acid ester on both ends (number-average molecular weight: 370, ratio of compound wherein n is 0:39% by mass)

Modifier Q: a condensate of succinic acid (50)/terephthalic acid (50)/1,6-hexanediol (100), which is capped with p-hydroxybenzoic acid ester on both ends (number-average molecular weight: 390, ratio of compound wherein n is 0:54% by mass)

Next, the resin composition of the present invention will be described. The resin composition of the present invention comprises the resin modifier of the present invention and has excellent moisture resistance, dimensional stability and optical properties. The resin used in the resin composition of the present invention is not particularly restricted. Examples of the resin include thermoplastic resins and thermosetting resins, and a thermoplastic resin can be preferably used.

Examples of the thermoplastic resins include polyvinyl chloride resins, polyethylene resins, polypropylene resins, polystyrene resins, polyvinyl acetate resins, polyurethane resins, cellulose-based resins, acrylic resins, AS (acrylonitrile-styrene) resins, ABS (acrylonitrile-butadiene-styrene) resins, fluorine-based resins, thermoplastic elastomers, polyamide resins, polyacetal resins, polycarbonate resins, modified polyphenylene ether resins, polyethylene terephthalate resins, polybutylene terephthalate resins, polylactic acid-based resins, cyclic polyolefin resins and polyphenylene sulfide resin, and these resins may be used individually, or two or more thereof may be used in combination.

Examples of the polyvinyl chloride resins include homopolymers, such as polyvinyl chloride and polyvinylidene chloride; and vinyl compound copolymers, such as copolymers of vinyl chloride or vinylidene chloride and vinyl acetate. These polyvinyl chloride resins may be used individually, or two or more thereof may be used in combination.

Examples of the polyethylene resins include low-density polyethylenes, medium-density polyethylenes, and high-density polyethylenes. These polyethylene resins may be used individually, or two or more thereof may be used in combination.

The polypropylene resins are not particularly restricted in terms of polymerization method, and examples of the polypropylene resins include homopolymers, random polymers, and block polymers. Such polypropylene resins may be used individually, or two or more thereof may be used in combination.

Examples of the cellulose-based resins include cellophane, celluloid, cellulose acetate, cellulose diacetate, cellulose triacetate, cellulose propionate, cellulose acetate propionate, cellulose acetate butyrate, methyl acetate, ethyl cellulose, carboxymethyl cellulose, hydroxyethyl cellulose, hydroxypropyl cellulose, ethylhydroxyethyl cellulose, and carboxymethylethyl cellulose. These cellulose-based resins may be used individually, or two or more thereof may be used in combination.

Examples of the acrylic resins include methyl polyacrylate and methyl polymethacrylate. These acrylic resins may be used individually, or two or more thereof may be used in combination.

Examples of the polyamide resins include aliphatic polyamides, such as nylon-6, nylon-66, nylon-10, nylon-12 and nylon-46; and aromatic polyamides produced from an aromatic dicarboxylic acid and an aliphatic diamine. These polyamide resins may be used individually, or two or more thereof may be used in combination.

Examples of the polyacetal resins include polyformaldehyde, polyacetaldehyde, polypropionaldehyde, and polybutylaldehyde. These polyacetal resins may be used individually, or two or more thereof may be used in combination.

Among the above-described resins, the resin used in the resin composition of the present invention is more preferably a cellulose-based resin, still more preferably a lower fatty acid ester of cellulose. The "lower fatty acid" in the lower fatty acid ester of cellulose means a fatty acid having 6 or less carbon atoms. Examples of such a lower fatty acid ester of cellulose include cellulose acetate, cellulose propionate and cellulose butyrate, as well as mixed fatty acid esters such as cellulose acetate propionate and cellulose acetate butyrate that are described in, for example, Japanese Unexamined Patent Application Publication No. H10-45804, Japanese Unexamined Patent Application Publication No. H8-231761 and U.S. Pat. No. 2,319,052 (Specification).

In the resin composition of the present invention, in addition to the resin modifier of the present invention, plasticizers and various additives, such as phenolic or sulfur-based antioxidants, ultraviolet absorbers, hindered amine-based light stabilizers, polyols and other inorganic compounds, may also be incorporated. These plasticizers and various additives may be used individually, or two or more thereof may be used in combination.

Examples of the plasticizers include phthalate-based plasticizers, such as dibutyl phthalate, butylhexyl phthalate, diheptyl phthalate, di(2-ethylhexyl)phthalate, diisononyl phthalate, diisodecyl phthalate, dilauryl phthalate, dicyclohexyl phthalate and dioctyl terephthalate; adipate-based plasticizers, such as dioctyl adipate, diisononyl adipate, diisodecyl adipate and di(butyl diglycol)adipate; phosphate-based plasticizers, such as triphenyl phosphate, tricresyl phosphate, trixylenyl phosphate, tri(isopropylphenyl)phosphate, triethyl phosphate, tributyl phosphate, trioctyl phosphate, tri(butoxyethyl)phosphate and octyldiphenyl phosphate; polyester-based plasticizers other than the present invention, in which ethylene glycol, diethylene glycol, triethylene glycol, 1,3-butanediol, 1,4-butanediol, 1,5-pentanediol, 1,6-hexanediol, neopentyl glycol, trimethylolpropane or the like is used as a polyhydric alcohol, oxalic acid, malonic acid, succinic acid, glutaric acid, adipic acid, pimelic acid, suberic acid, azelaic acid, sebacic acid, phthalic acid, isophthalic acid, terephthalic acid, cinnamic acid or the like is used as a dibasic acid and, as required, a monohydric alcohol, a monocarboxylic acid (e.g., acetic acid or an aromatic acid) or the like is used as a stopper; epoxy-based plasticizers, such as epoxidized soybean oil, epoxidized linseed oil, epoxidized tung oil, epoxidized fish oil, epoxidized beef tallow oil, epoxidized castor oil, epoxidized safflower oil, epoxidized methyl stearate, epoxidized butyl stearate, epoxidized 2-ethylhexyl stearate, epoxidized stearyl stearate, epoxidized polybutadiene, tris(epoxypropyl)isocyanurate, epoxidized tall oil fatty acid esters, epoxidized linseed oil fatty acid esters, bisphenol A diglycidyl ether, vinylcyclohexene diepoxide, dicyclohexene diepoxide and 3,4-epoxycyclohexylmethyl epoxycyclohexanecarboxylate; tetrahydrophthalic acid-based plasticizers; azelaic acid-based plasticizers; sebacic acid-based plasticizers, such as di-2-ethylhexyl sebacate (DOS) and dibutyl sebacate (DBS); stearic acid-based plasticizers; citric acid-based plasticizers; pyromellitic acid-based plasticizers; biphenylene polycarboxylic acid-based plasticizers; and polyhydric alcohol aromatic acid ester-based plasticizers (e.g., trimethylolpropane tribenzoate), among which, for example, polyester-based plasticizers other than the present invention, phthalate-based plasticizers, trimellitate-based plasticizers, adipate-based plasticizers, sebacic acid-based plasticizers and epoxy-based plasticizers are preferred.

Examples of specific compounds of the polyester-based plasticizers other than the resin modifier of the present invention include, but not limited to, the following plasticizers 1 to 13, and these compounds may be used individually, or two or more thereof may be used as a mixture.

The numbers in parentheses of the following plasticizers 1 to 4 each indicate a molar ratio, and these polyester-based plasticizers may be used individually, or two or more thereof may be used as a mixture.

Plasticizer-1: a compound represented by the following Formula (2):

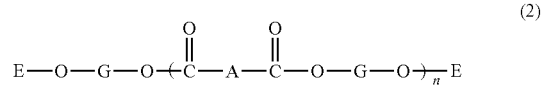

(wherein, a polyhydric alcohol component G consists of ethylene glycol (50) and 1,2-propylene glycol (50); a polycarboxylic acid component A consists of succinic acid (50) and terephthalic acid (50); terminals E are acetyl groups; and n=5).

Plasticizer-2: a compound represented by the Formula (2), wherein the polyhydric alcohol component G is 1,2-propylene glycol; the polycarboxylic acid component A is 2,6-naphthalenedicarboxylic acid; the terminals E are hydrogen atoms; and n=2.

Plasticizer-3: a compound represented by the Formula (2), wherein the polyhydric alcohol component G is ethylene glycol; the polycarboxylic acid component A is adipic acid; the terminals E are acetyl groups; and n=10.

Plasticizer-4: a compound represented by the Formula (2), wherein the polyhydric alcohol component G is 1,2-propylene glycol; the polycarboxylic acid component A is terephthalic acid; the terminals E are toluyl groups; and n=5.

Plasticizer-5: a compound represented by the following Formula (3):

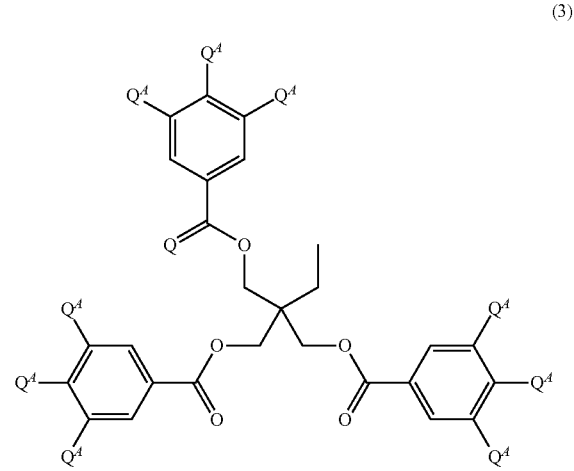

(wherein, all of substituents $Q^4$ are hydrogen atoms).

Plasticizer-6: a compound represented by the Formula (3), wherein all of the substituents $Q^4$ are methoxy groups.

Plasticizer-7

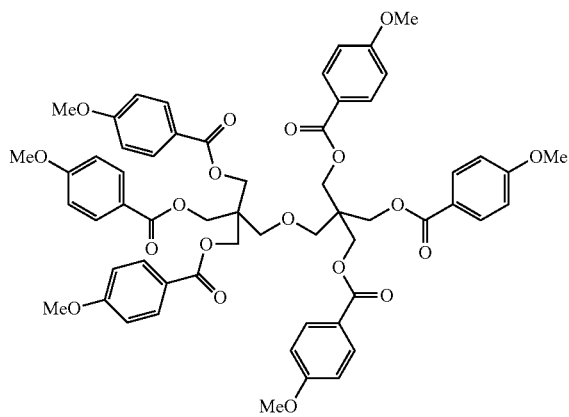

Plasticizer-8

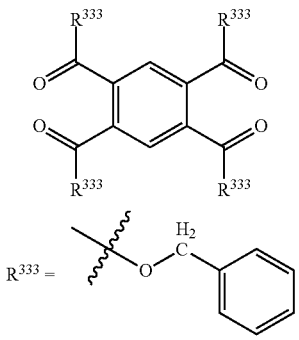

Plasticizer-9

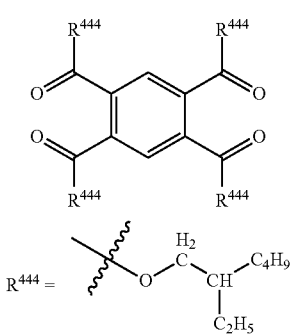

Plasticizer-10

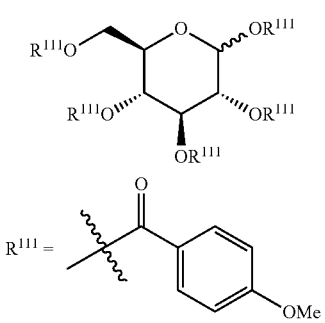

Plasticizer-11

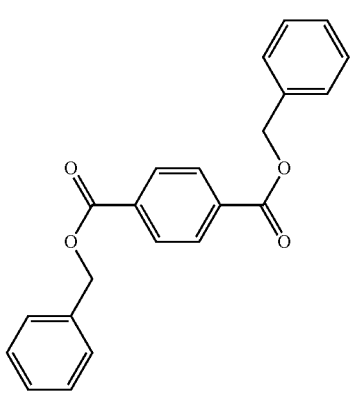

Plasticizer-12

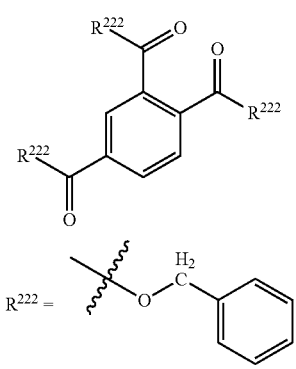

Plasticizer-13

These plasticizers can be incorporated in any amount within a range that does not impair the effects of the present invention; however, the amount is preferably 1 to 90 parts by mass, more preferably 10 to 80 parts by mass, with respect to 100 parts by mass of the resin.

Examples of the phenolic antioxidants include 2,6-di-tert-butyl-p-cresol, 2,6-diphenyl-4-octadecyloxyphenol, stearyl (3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(4,6-di-tert-butylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)iso-cyanurate, 1,3,5-tris(3,5-di-tert-butyl-4-hydroxybenzyl)iso-cyanurate, 1,3,5-tris(3,5-di-tert-butyl-4-hydroxybenzyl)-2,4,6-trimethylbenzene, 1,3,5-tris[(3,5-di-tert-butyl-4- hydroxyphenyl)propionyloxyethyl]isocyanurate, tetrakis[methylene-3-(3,5-di-tert-butyl-4-hydroxyphenyl) propionate]methane, 2-tert-butyl-4-methyl-6-(2-acryloyloxy-3-tert-butyl-5-methylbenzyl)phenol, 3,9-bis[2-{3-(3-tert-butyl-4-hydroxy-5-methylphenyl) propanoyloxy}-1,1-dimethylethyl]-2,4,8,10-tetraoxaspiro [5.5]undecane, and triethylene glycol-bis[β-(3-tert-butyl-4-hydroxy-5-methylphenyl)propionate]. These phenolic antioxidants can be incorporated in any amount within a range that does not impair the effects of the present invention; however, the amount is preferably 0.01 to 1 parts by mass, more preferably 0.03 to 0.8 parts by mass, with respect to 100 parts by mass of the resin.

Examples of the sulfur-based antioxidants include dialkyl thiodipropionates, such as dilauryl thiodipropionate, dimyristyl thiodipropionate, myristylstearyl thiodipropionate and distearyl thiodipropionate; and β-alkylmercaptopropionates of polyols, such as pentaerythritol-tetra(β-dodecylmercaptopropionate). These sulfur-based antioxidants can be incorporated in any amount within a range that does not impair the effects of the present invention; however, the amount is preferably 0.01 to 1 parts by mass, more preferably 0.03 to 0.8 parts by mass, with respect to 100 parts by mass of the resin.

Examples of the ultraviolet absorbers include 2-hydroxybenzophenones, such as 2,4-dihydroxybenzophenone, 2-hydroxy-4-methoxybenzophenone, 2-hydroxy-4-octoxybenzophenone, 2-hydroxy-4-tert-butyl-4'-(2-methacryloyloxyethoxyethoxy)benzophenone and 5,5'-methylene-bis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3-dodecyl-5-methylphenyl)benzotriazole, 2-(2-hydroxy-3-tert-butyl-5-C7 to C9 mixed alkoxy-carbonylethylphenyl)triazole, 2-(2-hydroxy-3,5-dicumylphenyl)benzotriazole, 2,2'-methylene-bis(4-tert-octyl-6-benzotriazolylphenol) and polyethylene glycol esters of 2-(2-hydroxy-3-tert-butyl-5-carboxyphenyl)benzotriazole; 2-(2-hydroxyphenyl)-1,3,5-triazines, such as 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2-(2-hydroxy-4-octoxyphenyl)-4,6-bis(2,4-dimethylphenyl)-1,3,5-triazine, 2-(2-hydroxy-4-acryloyloxyethoxyphenyl)-4,6-bis(2,4-dimethylphenyl)-1,3,5-triazine, 2-(2-hydroxy-4-(2-(2-ethylhexanoyloxy)ethyloxy)phenyl)-4,6-diphenyl-1,3,5-triazine, 2,4,6-tris(2-hydroxy-4-octyloxyphenyl)-1,3,5-triazine and 2,4,6-tris(2-hydroxy-3-methyl-4-(2-octanoyloxyethyl)phenyl)-1,3,5-triazine; benzoates, such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides, such as 2-ethyl-2'-ethoxyoxanilide and 2-ethoxy-4'-dodecyloxanilide; and cyanoacrylates, such as ethyl-α-cyano-β,β-diphenylacrylate, methyl-2-cyano-3-methyl-3-(p-methoxyphenyl)acrylate and tetrakis(α-cyano-β,β-diphenylacryloyloxymethyl) methane. These ultraviolet absorbers can be incorporated in any amount within a range that does not impair the effects of the present invention; however, the amount is preferably 0.01 to 5 parts by mass, more preferably 0.03 to 3 parts by mass, with respect to 100 parts by mass of the resin.

Examples of the hindered amine-based light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).bis(tridecyl)-1,2,3,4-butanetetracarboxylate, bis(1,2,2,6,6-pentamethyl-4-piperidyl).bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/dibromoethane polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazin e polycondensates, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl) amino)-s-triazine-6-yl]-1,5,8,12-tetraazadodecane, 1,6,11-tris[2,4-bis(N-butyl-N-(2,2,6,6-tetramethyl-4-piperidyl) amino-s-triazine-6-ylamino]undecane, 1,6,11-tris[2,4-bis(N-butyl-N-(1,2,2,6,6-pentamethyl-4-piperidyl)amino-s-triazine-6-ylamino]undecane, 3,9-bis[1,1-dimethyl-2-{tris(2,2,6,6-tetramethyl-4-piperidyloxycarbonyl) butylcarbonyloxy}ethyl]-2,4,8,10-tetraoxaspiro[5.5] undecane, 3,9-bis[1,1-dimethyl-2-{tris(1,2,2,6,6-pentamethyl-4-piperidyloxycarbonyl) butylcarbonyloxy}ethyl]-2,4,8,10-tetraoxaspiro[5.5] undecane, and bis(1-undecyloxy-2,2,6,6-tetramethylpiperidine-4-yl)carbonate. These hindered amine-based light stabilizers can be incorporated in any amount within a range that does not impair the effects of the present invention; however, the amount is preferably 0.01 to 1 parts by mass, more preferably 0.03 to 0.8 parts by mass, with respect to 100 parts by mass of the resin.

Examples of the polyols include trimethylolpropane, ditrimethylolpropane, pentaerythritol, dipentaerythritol, polypentaerythritol, stearic acid half esters of pentaerythritol or dipentaerythritol, bis(dipentaerythritol)adipate, glycerin, tris (2-hydroxyethyl)isocyanurate, sorbitol, mannitol, and lactitol. These polyols can be incorporated in any amount within a range that does not impair the effects of the present invention; however, the amount is preferably 0.01 to 2 parts by mass, more preferably 0.01 to 1 parts by mass, with respect to 100 parts by mass of the resin.

Examples of other inorganic compounds include calcium silicate, calcium phosphate, calcium oxide, calcium hydroxide, magnesium silicate, magnesium phosphate, magnesium oxide, and magnesium hydroxide. These other inorganic compounds can be incorporated in any amount within a range that does not impair the effects of the present invention; however, the amount is preferably 0.01 to 5 parts by mass, more preferably 0.03 to 3 parts by mass, with respect to 100 parts by mass of the resin.

In addition to the above, in the resin composition of the present invention, as required, other additives such as a filler, a coloring agent, a cross-linking agent, an antistatic agent, an anti-fogging agent, a plate-out inhibitor, a surface treatment agent, a lubricant, a flame retardant, a fluorescent agent, an antifungal agent, an antibacterial agent, a metal inactivator, a mold-releasing agent, a pigment, a processing aid, a foaming agent, an organic acid metal salt, a hydrotalcite compound, a zinc-modified hydrotalcite and a zeolite compound may also be incorporated in such a range that does not impair the effects of the present invention.

The resin composition of the present invention is characterized by comprising the resin modifier represented by the Formula (1), and the blending method and molding method thereof are not particularly restricted. Examples of the blending method include a mixing method using an ordinary blender, mixer or the like, a melt-kneading method using an extruder and a method of mixing the materials along with a solvent and casting the resulting solution, and examples of the molding method include extrusion molding, injection molding, stretch film molding and blow molding.

The shape of a molded article obtained by molding the resin composition of the present invention is not particularly restricted, and examples of the molded article include sheets, films and special-form articles.

The use of the thus obtained molded article is not particularly restricted, and examples thereof include food containers, electronic components, automobile parts, medical materials, film/sheet materials, fiber materials, optical materials, resins for paints, resins for inks, resins for toners, and resins for adhesives.

EXAMPLES

The present invention will now be described in more detail by way of examples thereof. The present invention, however, is not restricted to the following Examples by any means.

Examples 1 to 17 and Comparative Examples 1 to 14

The resin modifiers shown in Tables 1 and 2 below were each evaluated for the moisture resistance (moisture permeability), optical properties (phase difference variation) and dimensional stability in accordance with the below-described procedures. The results thereof are also shown in Tables 1 and 2. The number-average molecular weight was measured by the following procedure.

Number-Average Molecular Weight

The resin modifiers A to Q of the present invention and Comparative Compounds 1 to 14 were each dissolved in tetrahydrofuran (THF) to prepare 0.5%-by-mass sample solutions, and the number-average molecular weight was measured by gel permeation chromatography (GPC) under the following conditions. A calibration curve was prepared using polystyrene (molecular weight standards manufactured by GL Sciences Inc.: molecular weight=162, 370, 580, 1,000, 2,000, 3,000 and 5,000). As the column, SHODEX KF-802 manufactured by Showa Denko K.K. was used. The column temperature was set at 40° C., and the measurement was carried out using THF as an eluent at a flow rate of 1 ml/min and a refractometer (RI) as a detector.

Moisture Resistance (Moisture Permeability)

In a mixed solvent composed of 900 parts by mass of methylene chloride and 100 parts by mass of methyl alcohol, 85 parts by mass of cellulose triacetate (acetylation degree=61%, polymerization degree=260) and 15 parts by mass of each modifier were uniformly dissolved with stirring, whereby various dope solutions for evaluation and film formation were prepared. Then, the thus obtained dope solutions were each flow-casted on a glass plate at a thickness of about 80 µm and dried at room temperature for 16 hours, followed by 1-hour drying at 50° C. and 1-hour drying at 120° C., whereby various evaluation films were obtained. The thus obtained films all had a thickness of about 80 µm. For these films, the moisture permeability was measured in accordance with the method described in JIS Z 0208 under the conditions of 40° C. and 80% relative humidity. A smaller moisture permeability value represents superior moisture resistance. As for the moisture resistance, a moisture permeability of 360 g/m$^2$/day or less indicates excellent performance. The thus obtained evaluation results are also shown in Tables 1 and 2 below.

Optical Properties (Phase Difference Variation)

In a mixed solvent composed of 900 parts by mass of methylene chloride and 100 parts by mass of methyl alcohol, 90 parts by mass of cellulose triacetate (acetylation degree=61%, polymerization degree=260) and 10 parts by mass of each modifier were uniformly dissolved with stirring, whereby various dope solutions for evaluation and film formation were prepared. Then, the thus obtained dope solutions were each flow-casted on a glass plate at a thickness of about 80 µm and dried at room temperature for 16 hours, followed by 1-hour drying at 50° C. and 1-hour drying at 120° C., whereby various evaluation films were obtained. The thus obtained films all had a thickness of about 80 µm. These films were each dried for 48 hours in an environment of 25° C. and 15% relative humidity, and the post-drying phase difference in the film thickness direction was measured as "phase difference in dry state". Subsequently, the same film was left to stand for 72 hours at 40° C. and 80% relative humidity, and the phase difference in the film thickness direction was measured as "phase difference in high-temperature and high-humidity state". The value of "phase difference variation" was calculated using the following equation and indicated as an absolute value. A smaller phase difference variation means superior performance, and a phase difference variation of 30 or less indicates excellent performance.

|Phase difference variation|=phase difference in dry state−phase difference in high-temperature and high-humidity state Dimensional Stability In a mixed solvent composed of 900 parts by mass of methylene chloride and 100 parts by mass of methyl alcohol, 85 parts by mass of cellulose triacetate (acetylation degree=61%, polymerization degree=260) and 15 parts by mass of each modifier were uniformly dissolved with stirring, whereby various dope solutions for evaluation and film formation were prepared. Then, the thus obtained dope solutions were each flow-casted on a glass plate at a thickness of about 80 µm and dried at room temperature for 16 hours, followed by 1-hour drying at 50° C. and 1-hour drying at 120° C., whereby various evaluation films were obtained. The thus obtained films all had a thickness of about 80 µm. These films were each left to stand for 24 hours in an environment of 40° C. and 80% relative humidity and then visually observed to make a three-scale evaluation based on the following criteria.

Excellent: No distortion of the film was observed.
Good: A slight distortion of the film was observed.
Not acceptable: A large distortion of the film was observed.

As for the dimensional stability, evaluations of "excellent" and "good" indicate excellent performance. The thus obtained evaluation results are also shown in Tables 1 and 2 below.

The phase difference in the film thickness direction was determined in accordance with the following equation at a wavelength of 590 nm in an environment of 25° C. and 60% relative humidity using an automatic birefringence meter RETS-100 (manufactured by Otsuka Electronics Co., Ltd.).

Phase difference in thickness direction=$\{(nx+ny)/2-nz\} \times d$ (wherein, nx represents the refractive index in the direction of the highest film in-plane refractive index; ny represents the film in-plane refractive index in the direction perpendicular to the direction of nx; nz represents the refractive index in the film thickness direction; and d represents the film thickness (nm))

The thus obtained evaluation results are also shown in Tables 1 and 2 below.

Comparative Compound 1: triphenyl phosphate
Comparative Compound 2: a condensate of succinic acid (50)/terephthalic acid (50)/ethylene glycol (100), whose ends are both not capped (number-average molecular weight: 670)
Comparative Compound 3: the condensate of Comparative Compound 2 in which ethylene glycol was replaced with 1,2-propylene glycol (number-average molecular weight: 1,000)
Comparative Compound 4: the condensate of Comparative Compound 2 (number-average molecular weight: 1,400)
Comparative Compound 5: a condensate of succinic acid (50)/terephthalic acid (50)/ethylene glycol (100), which is capped with benzoic acid ester on both ends (number-average molecular weight: 450)
Comparative Compound 6: a condensate of succinic acid (50)/terephthalic acid (50)/1,2-propylene glycol (100), which is capped with benzoic acid ester on both ends (number-average molecular weight: 450)
Comparative Compound 7: the condensate of Comparative Compound 5 (number-average molecular weight: 1,050)
Comparative Compound 8: a condensate of succinic acid (30)/terephthalic acid (70)/1,2-propylene glycol (100),

TABLE 1

| | | Modifier | Number-average molecular weight | Ratio of compound wherein n = 0 (% by mass) | Moisture permeability (g/m²/day) | Phase difference variation | Dimensional stability |
|---|---|---|---|---|---|---|---|
| Example | 1 | A | 880 | 15 | 279 | 22 | excellent |
| | 2 | B | 880 | 15 | 316 | 27 | excellent |
| | 3 | C | 650 | 20 | 268 | 24 | excellent |
| | 4 | D | 570 | 23 | 246 | 12 | good |
| | 5 | E | 740 | 17 | 299 | 26 | good |
| | 6 | F | 660 | 20 | 265 | 22 | excellent |
| | 7 | G | 1,190 | 10 | 355 | 29 | excellent |
| | 8 | H | 650 | 29 | 251 | 22 | excellent |
| | 9 | I | 700 | 23 | 291 | 22 | excellent |
| | 10 | J | 550 | 24 | 259 | 22 | excellent |
| | 11 | K | 670 | 27 | 264 | 19 | excellent |
| | 12 | L | 640 | 30 | 269 | 23 | excellent |
| | 13 | M | 640 | 24 | 296 | 24 | excellent |
| | 14 | N | 490 | 39 | 242 | 18 | excellent |
| | 15 | O | 410 | 51 | 280 | 6 | excellent |
| | 16 | P | 370 | 39 | 264 | 11 | excellent |
| | 17 | Q | 390 | 54 | 248 | 10 | excellent |

TABLE 2

| | | Modifier | Number-average molecular weight | Moisture permeability (g/m²/day) | Phase difference variation | Dimensional stability |
|---|---|---|---|---|---|---|
| Comparative Example | 1 | not added | — | 700 | 34 | Good |
| | 2 | Comparative compound 1 | — | 400 | 40 | excellent |
| | 3 | Comparative compound 2 | 670 | 322 | 34 | good |
| | 4 | Comparative compound 3 | 1,000 | 336 | 38 | good |
| | 5 | Comparative compound 4 | 1,400 | 304 | 36 | good |
| | 6 | Comparative compound 5 | 450 | 276 | 32 | not acceptable |
| | 7 | Comparative compound 6 | 450 | 282 | 36 | good |
| | 8 | Comparative compound 7 | 1,050 | 289 | 34 | good |
| | 9 | Comparative compound 8 | 1,050 | 294 | 38 | good |
| | 10 | Comparative compound 9 | 500 | 318 | 34 | good |
| | 11 | Comparative compound 10 | 1,130 | 293 | 36 | good |
| | 12 | Comparative compound 11 | 1,300 | 310 | 46 | good |
| | 13 | Comparative compound 12 | 480 | 295 | 30 | not acceptable |
| | 14 | Comparative compound 13 | 500 | 334 | 31 | good | which is capped with benzoic acid ester on both ends (number-average molecular weight: 1,050)

Comparative Compound 9: a condensate of succinic acid (50)/terephthalic acid (50)/ethylene glycol (100), which is capped with n-octylic acid ester on both ends (number-average molecular weight: 500)

Comparative Compound 10: a condensate of succinic acid (50)/terephthalic acid (50)/ethylene glycol (100), which is capped with acetic acid ester on both ends (number-average molecular weight: 1,130)

Comparative Compound 11: a condensate of adipic acid (100)/ethylene glycol (100), which is capped with benzoic acid ester on both ends (number-average molecular weight: 1,300)

Comparative Compound 12: a condensate of terephthalic acid (100)/1,2-propylene glycol (100), which is capped with benzoic acid ester on both ends (number-average molecular weight: 480)

Comparative Compound 13: a condensate of terephthalic acid (100)/ethylene glycol (50)/1,2-propylene glycol (50), which is capped with p-tert-butylbenzoic acid ester on both ends (number-average molecular weight: 500)

As clearly seen from Tables 1 and 2, the modifiers according to the present invention were satisfactory for all of moisture resistance (moisture permeability), dimensional stability and optical properties (phase difference variation); however, some of the Comparative Compounds had good moisture resistance but poor optical properties, while some of other Comparative Compounds had good dimensional stability but poor moisture resistance and optical properties. Therefore, it is apparent that the resin modifier of the present invention is well-balanced and excellent in all of moisture resistance, dimensional stability and optical properties.

The invention claimed is:

1. A resin modifier comprising a compound represented by the following Formula (1):

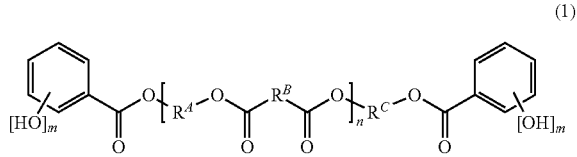

(wherein, m represents an integer of 1 to 5; n represents an integer of 0 to 50; and $R^A$, $R^B$ and $R^C$ each represent a hydrocarbon group having 2 to 20 carbon atoms, or a hydrocarbon group having 2 to 20 carbon atoms which has at least one atom selected from the group consisting of an oxygen atom, a sulfur atom and a nitrogen atom).

2. The resin modifier according to claim 1, wherein said $R^A$, $R^B$ and $R^C$ of said compound represented by said Formula (1) are each a hydrocarbon group having 2 to 12 carbon atoms, or a hydrocarbon group having 2 to 12 carbon atoms which has at least one atom selected from the group consisting of an oxygen atom, a sulfur atom and a nitrogen atom.

3. The resin modifier according to claim 1, which is used in a thermoplastic resin.

4. The resin modifier according to claim 2, which is used in a thermoplastic resin.

5. The resin modifier according to claim 3, wherein said thermoplastic resin is a cellulose-based resin.

6. The resin modifier according to claim 4, wherein said thermoplastic resin is a cellulose-based resin.

7. A resin composition comprising the resin modifier according to claim 1.

8. The resin modifier according to claim 1, wherein m=1.

9. The resin modifier according to claim 8, wherein a hydroxyl group exists at the 4-position on each aromatic ring.

* * * * *